United States Patent [19]
Ryan et al.

[11] Patent Number: 5,110,695
[45] Date of Patent: May 5, 1992

[54] RECHARGEABLE ELECTROLYTIC CELL WITH AMORPHOUS ALLOY ELECTRODE

[75] Inventors: Dominic H. Ryan, Baie D'Urfe; John O. Strom-Olsen, Montreal, both of Canada; Jan Kycia, St. James, N.Y.; Bipin Patel, LaSalle; Francois Dumais, Montreal, both of Canada

[73] Assignee: The Royal Institution for the Advancement of Lerning (McGill University), Montreal, Canada

[21] Appl. No.: 540,104

[22] Filed: Jun. 19, 1990

[51] Int. Cl.⁵ ............................................. H01M 10/24
[52] U.S. Cl. ............................ 429/206; 429/219; 429/220; 429/221; 429/222
[58] Field of Search ................................. 429/218-223, 429/206

[56] References Cited
U.S. PATENT DOCUMENTS

| | | | |
|---|---|---|---|
| 4,084,047 | 4/1978 | Himy et al. | 429/206 |
| 4,623,597 | 11/1986 | Sapru et al. | 429/218 X |
| 4,696,873 | 9/1987 | Yagasaki et al. | 429/218 X |
| 4,752,546 | 6/1988 | Heuts et al. | 429/218 |

Primary Examiner—Anthony Skapars
Attorney, Agent, or Firm—Bachman & LaPointe

[57] ABSTRACT

A rechargeable battery has a pair of electrodes, one having nickel hydroxide as the active component and the other comprising as active component an amorphous alloy of at least one element selected from the group consisting of early transition metals and rare earth metals; and at least one late transition metal; the battery displays superior characteristics as compared with conventional Ni-Cd rechargeable batteries; essentially the battery functions as a hydrogen cell, involving intercalation of hydrogen into the amorphous alloy; a new method of charging involves charging a rechargeable cell and periodically interrupting the charging for a short interval and electrically shorting the cell during the short interval.

7 Claims, 10 Drawing Sheets

RECHARGEABLE ELECTROLYTIC CELL WITH AMORPHOUS ALLOY ELECTRODE

BACKGROUND OF THE INVENTION i) Field of the Invention

This invention relates to a rechargeable electrolytic cell and to a method of charging a rechargeable electrolytic cell.

ii) Description of Prior Art

Electrolytic cells are classified as rechargeable or non-rechargeable according to whether the energy may be restored to the cell by reversing the direction of the current flow. The standard dry cell, for example, zinc carbon or alkaline cells, used in transistor radios are probably the most familiar example of the non-rechargeable type, and the lead-acid accumulators in cars and Ni-Cd cells the best known rechargeable types. Since a non-rechargeable cell has to be discarded after use, it may at first sight seem surprising that such a cell finds any application at all. However, to date rechargeable cells are inferior in a number of key ways to non-rechargeable cells. For example, the Ni-Cd cell, which is currently the only practicable alternative to the dry cells mentioned above, has at full charge only about one-tenth the stored energy of the dry cell. Furthermore there is a limit to the number of times they can be recharged. The accepted figure for the number of times that recharging is possible is about 1,000.

SUMMARY OF THE INVENTION

It is an object of this invention to provide a rechargeable electrolytic cell or battery of increased storage capacity, as compared with Ni-Cd cells.

It is a further object of this invention to provide a rechargeable electrolytic cell or battery having a longer useful life than Ni-Cd cells.

It is a still further object of this invention to provide a rechargeable electrolytic cell or battery in which the electrodes suffer no or minimal deterioration as a result of over-charging or over-discharging.

It is yet another object of this invention to provide a rechargeable electrolytic cell or battery which is essentially free of corrosion problems.

It is yet another object of the invention to provide a rechargeable electrolytic cell or battery which functions well at low temperatures.

It is still another object of the invention to provide a rechargeable electrolytic cell or battery which is compatible with existing batteries and may be used as a direct replacement.

It is yet another object of this invention to provide an improved charging procedure for a rechargeable electrolytic cell or battery.

In accordance with one aspect of the invention there is provided a rechargeable cell having first and second electrodes in spaced apart relationship and electrically connected internally by an electrolyte. Each electrode has connecting means for electrical connection with an external electrically conductive circuit. The first electrode has an active component of nickel hydroxide in electrical connection with the electrolyte and the connecting means of the first electrode.

The second electrode has an active component of an amorphous alloy in electrical connection with the electrolyte and the connecting means of the second electrode. The amorphous alloy comprises at least one metal selected from the group consisting of early transition metals and rare earth metals of the Periodic Table of Elements, and at least one metal which is a late transition metal of the Periodic Table of Elements.

In another aspect of the invention there is provided a method of charging a rechargeable electrolytic cell which cell comprises first and second spaced apart electrodes electrically connected internally of the cell by an electrolyte, and having connecting means for electrically connecting the electrodes with an external electrically conductive circuit. The method comprises electrically connecting the electrodes through the connecting means to a charging source effective to charge the cell and subjecting the cell to a charging cycle which comprises charging the cell by means of the charging source and periodically interrupting the charging for a short interval and electrically shorting the cell during the short interval.

DESCRIPTION OF PREFERRED EMBODIMENTS i) Electrodes a) Nickel Electrode

The cell of the invention has a pair of electrodes in spaced apart relationship. One of the electrodes comprises nickel hydroxide as an active component and for this purpose the "nickel" electrode of a conventional Ni-Cd cell may be employed.

Such an electrode may be formed by blending or admixing nickel hydroxide with an electrically conductive material or by forming a layer, coating or surface of nickel hydroxide on an electrically conductive substrate.

The nickel electrode may also be formed by depositing nickel hydroxide on or in the pores of an electrically conductive electrode, or by electrodeposition on a conducting sheet of, for example, nickel, or on a metallic fibre.

b) Amorphous Alloy Electrode

The amorphous alloy electrode contains as an active component an amorphous alloy of at least one metal selected from the group consisting of early transition metals and rare earth metals and at least one late transition metal. The early transition metals are in particular Ti, V, Zr, Nb, Hf and Ta; the early transition metals and rare earth metals are particularly characterized in that they absorb hydrogen and form stable hydrides. The late transition metals are in particular Fe, Co, Ni, Cu, Ru, Rh, Pd and Ag and do not form stable hydrides.

The rare earth metals are to be understood to include Sc, Y and La as well as the lanthanides Ce, Pr, Nd, Pm, Sm, Eu, Gd, Tb, Dy, Ho, Er, Tm, Yb and Lu. In the versions of the Periodic Table of Elements, in The Merck Index, Tenth Edition, these elements are shown as being adjacent the early transition metals.

In accordance with the invention the amorphous alloys contain at least one metal selected from early transition metals and rare earth metals, and at least one late transition metal; including at least one metal of each type ensures that the resulting alloy readily absorbs hydrogen to form a hydride in a readily reversible reaction.

Binary alloys are particularly preferred and an especially preferred alloy is based on nickel and zirconium with a Ni:Zr ratio of 60:40.

The electrode may comprise ribbons of the alloy formed by rapid quenching through meltspinning, which avoids the need for binders and conductive graphite, so that the manufacture is relatively simple; the electrode being composed entirely of the active amorphous alloy.

Electrodes based on crystalline materials may generally be expected to store more charge per unit mass of active material than those based on an amorphous or non-crystalline material in accordance with the invention; on the other hand, the amorphous alloys of the invention do not suffer the disadvantage exhibited by crystalline materials, namely, of disintegrating into a fine powder on forming hydrides. Such crystalline materials require a supporting structure whereas the amorphous alloys of the invention do not.

Furthermore, the powdering and severe mechanical working associated with the hydrogen exchange process makes crystalline materials highly susceptible to corrosion usually necessitating the inclusion of additives to inhibit such corrosion; the amorphous alloy electrodes of the invention do not suffer this corrosion problem and have an intrinsically longer life time.

ii) Cell

The cell or battery contains an electrolyte which permits passage of hydrogen ions. The electrolyte should not be one which is corrosive to the electrodes. Thus the electrolyte may be the electrolyte usually employed in Ni-Cd cells, more especially an aqueous solution of potassium hydroxide having a density of 1.18–1.23 g/cm$^3$. The potassium hydroxide may conveniently be impregnated in a textile fabric.

A simplified equation representing the cells charge-discharge cycle for the particular embodiment in which the amorphous alloy is a Ni-Zr alloy is set out below:

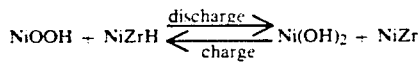

During the charge cycle the hydrogen ion enters into solution in the amorphous Ni-Zr alloy to form the hydride.

The cell is similar to Ni-Cd in that it uses the same Ni(OH)$_2$ electrode for one half, but replaces the CdO electrode with one based on the amorphous alloy. The cell may be considered a hydrogen cell, the moving charge being H$^+$ and the process of charge storage involves no state change or chemical reaction but rather the intercalation of hydrogen into the amorphous alloy. The voltage generated by the cell is determined by the electrochemical potential between hydrogen in the amorphous alloy and in Ni(OH)$_2$, and varies for the case in which the amorphous alloy is an NiZr alloy between 1.0V and 1.5V, depending on the state of charge. All of the currently available commercial cells, both rechargeable and non-rechargeable, e.g., Ni-Cd, Zn-Mn and Alkaline-Mn, also provide voltages in this range so that the cell of the invention may be used as a direct replacement for them.

iii) Method of Charging

A standard procedure involves charging a rechargeable cell at constant current either for a fixed time or until a pre-selected cell voltage is reached. The method of the invention yields a threefold increase in cell capacity. At regular intervals during a standard charging cycle the charging is interrupted and the cell shorted out for a few seconds ("flashing"), then charging is resumed. Typical parameters in a laboratory scale cell are five equally spaced shorts each of 1 to 30, preferably 5 to 20 seconds, more preferably about 10 seconds duration, limited to a minimum cell voltage of 0.1V. The method maintains high capacity, for example, after ten cycles without shorting, capacity was reduced by 50%. The charging procedure of the invention increases the efficiency of hydrogen uptake and eliminates the need for surface coatings of noble metals employed in early cells.

When applied to the particular cell of this invention the procedure increased the efficiency of hydrogen uptake of the NiZr electrode.

BRIEF DESCRIPTION OF DRAWINGS

FIG. 3 shows the improvement in charge capacity resulting from the flashing of the invention.

FIG. 5 shows the effect of high discharge current densities.

Figure 1A:
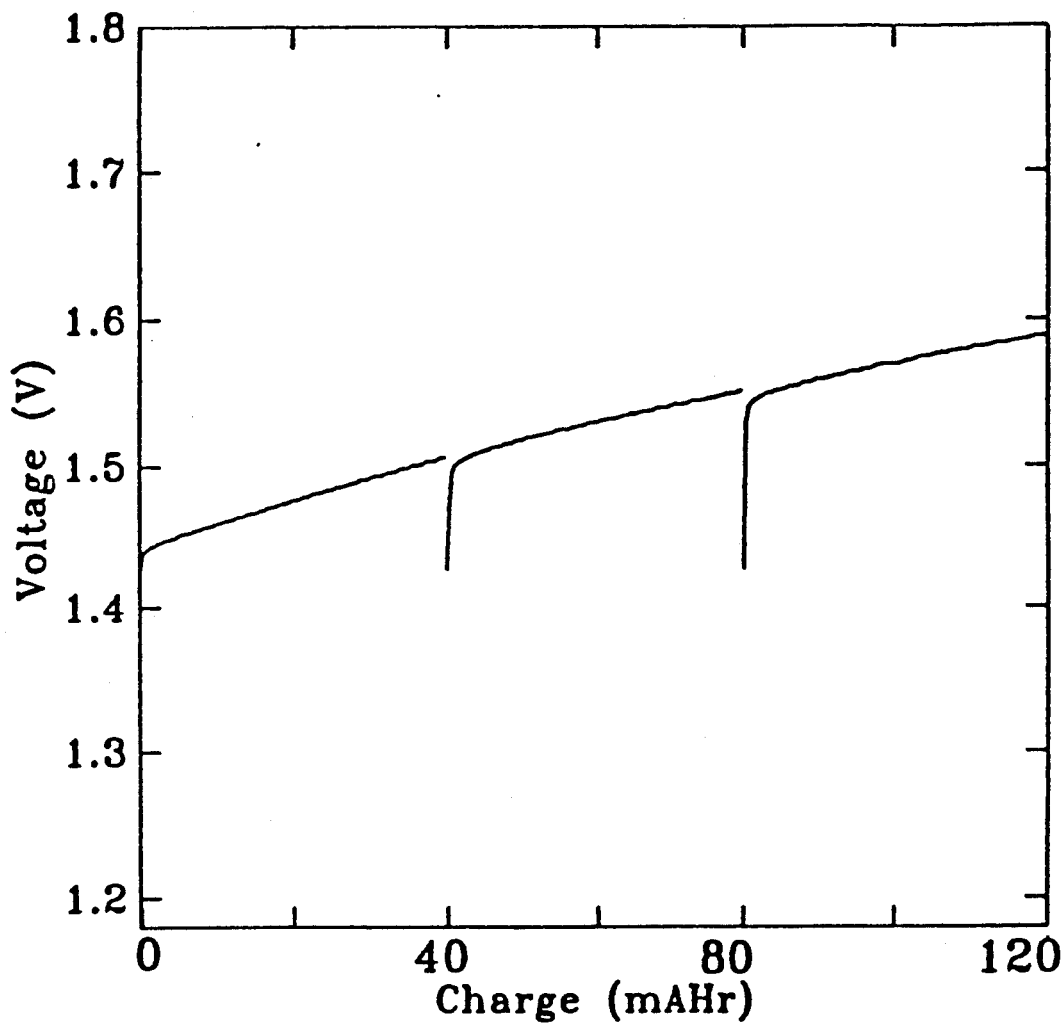
FIG. 1(a) shows the charging curve (i.e., the voltage across the cell as a function of time for a given charging current density) for a 3-hour charge cycle, and FIG. 1(b) the discharging curve at a 2.5 hour rate.
Figure 1B:
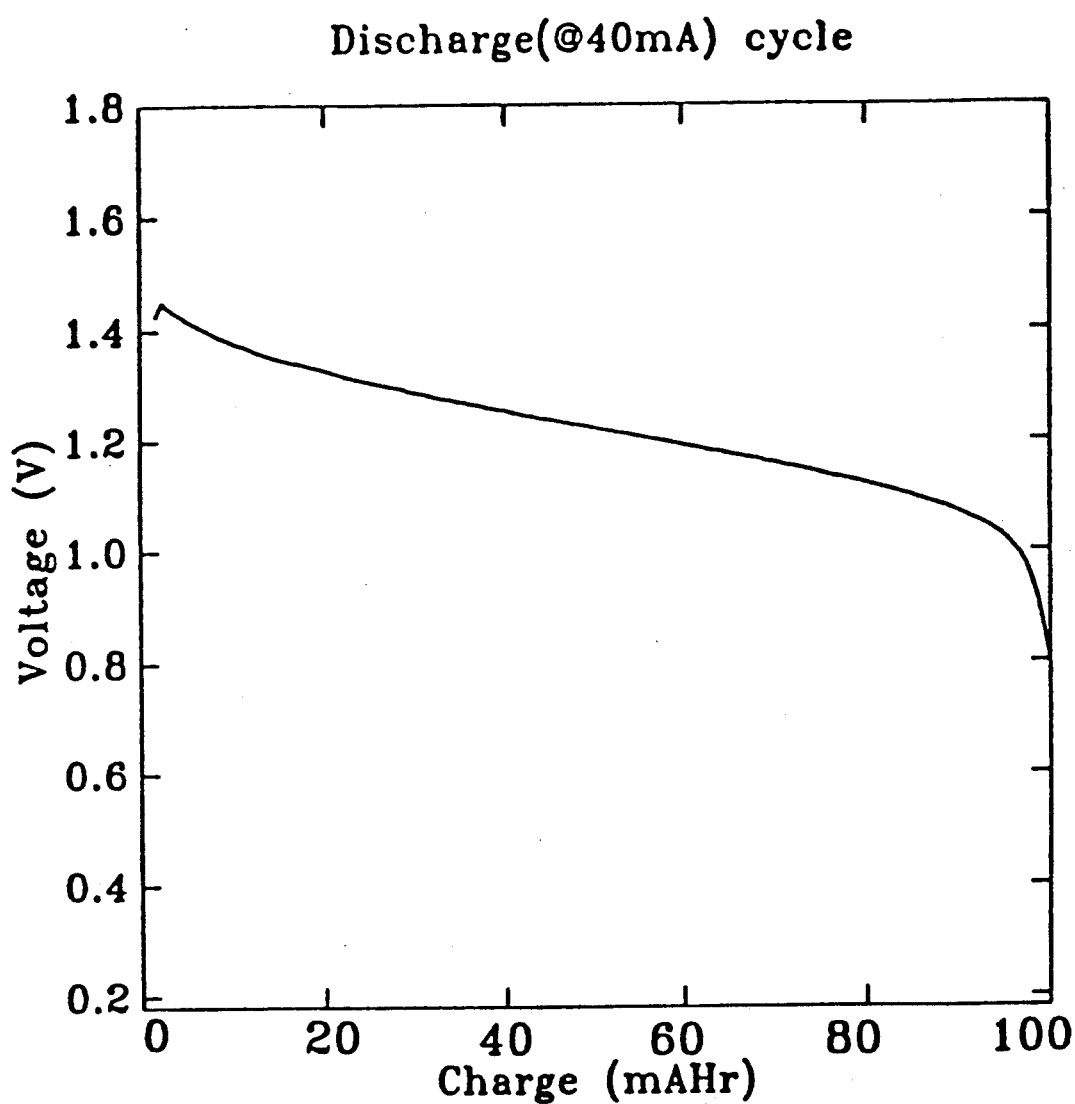
FIG. 1 shows a typical performance of a cell of the invention.
Figure 2:
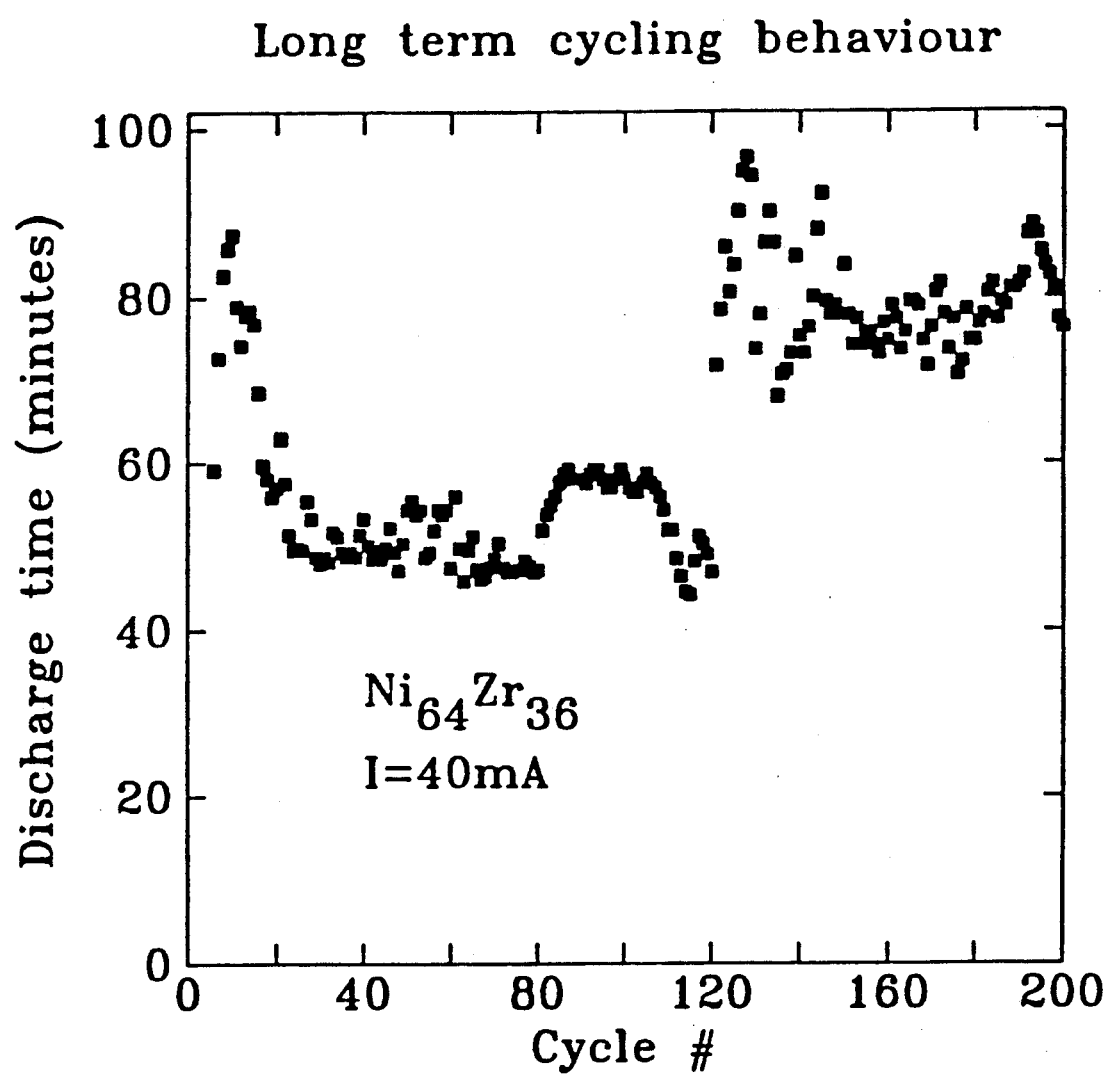
FIG. 2 shows the long term performance of a cell of the invention with no significant loss of performance over 200 cycles.
Figure 3A:
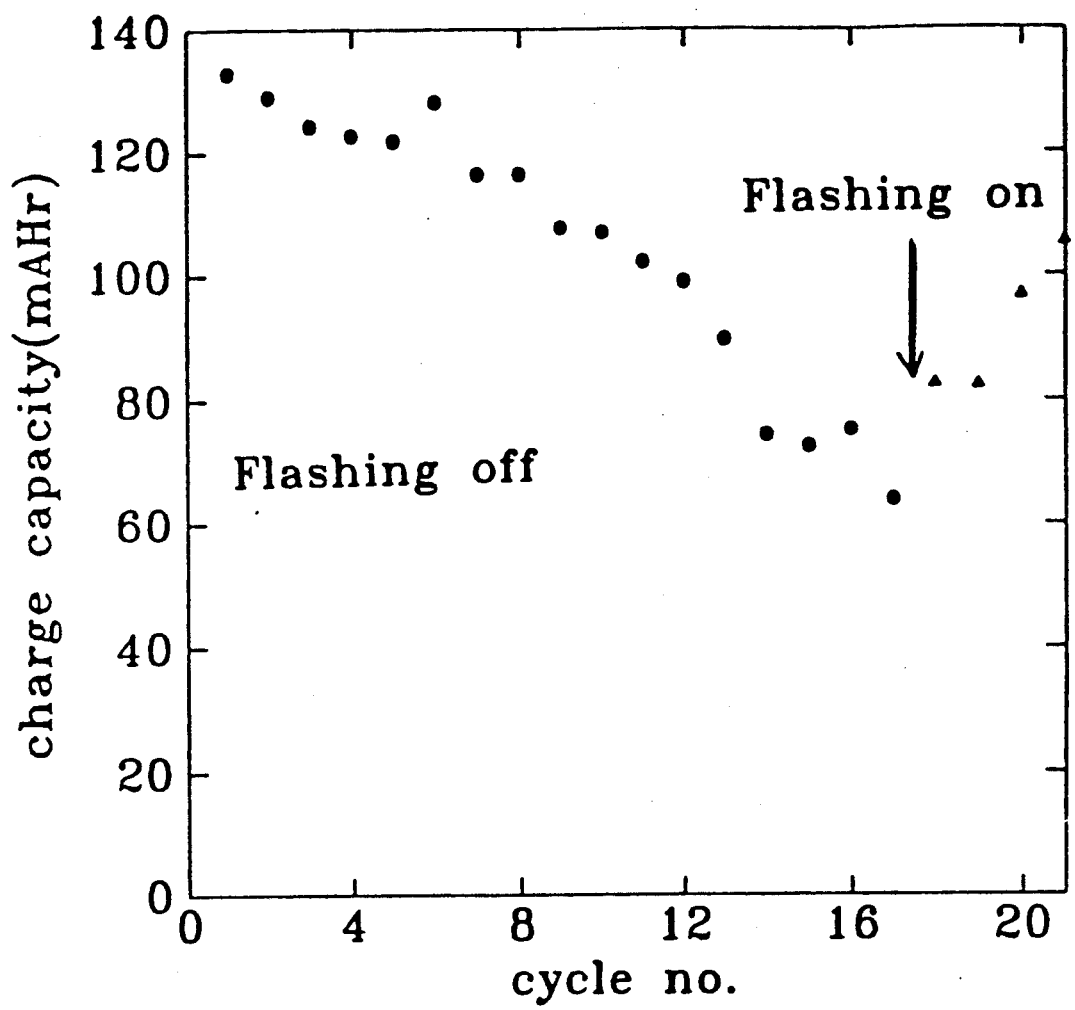
FIG. 3(a) shows the recovery of capacity when flashing is resumed after cycling without flashing.
Figure 3B:
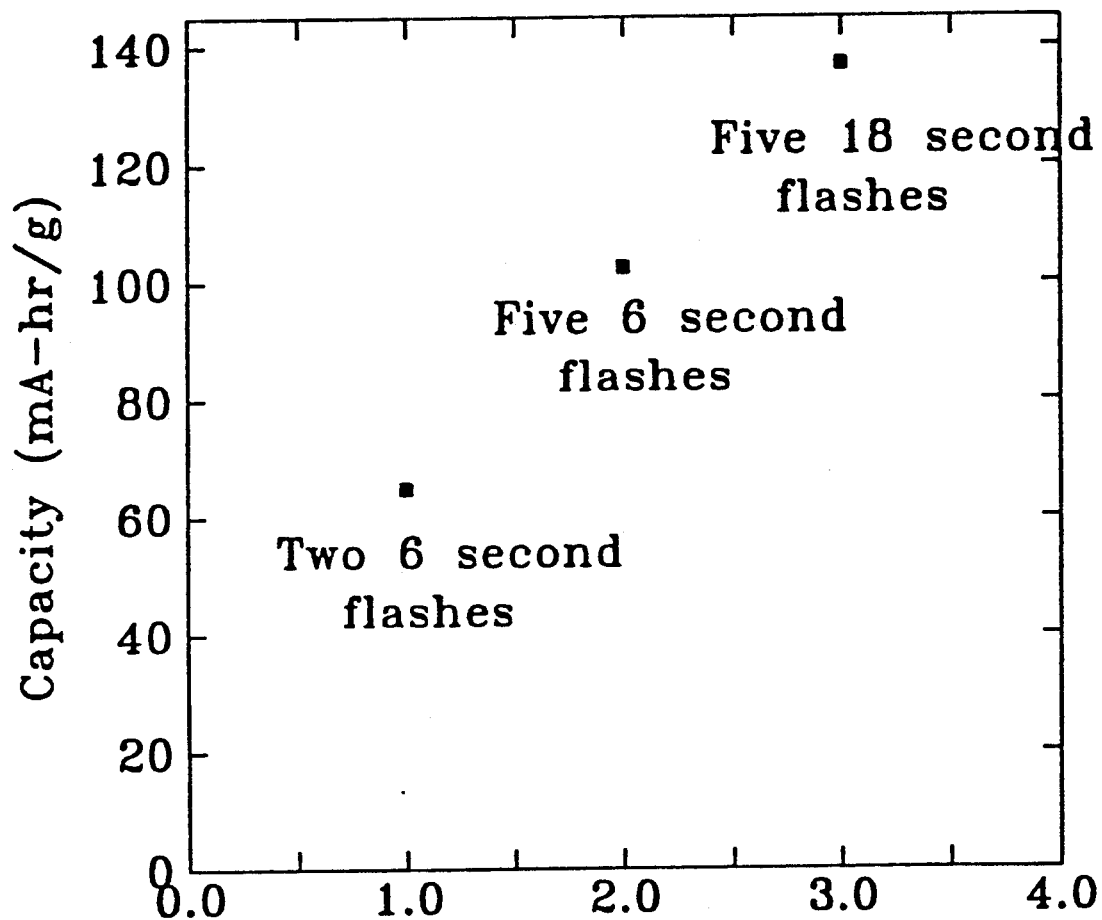
FIG. 3(b) shows the effect of various flashing procedures.
Figure 4:
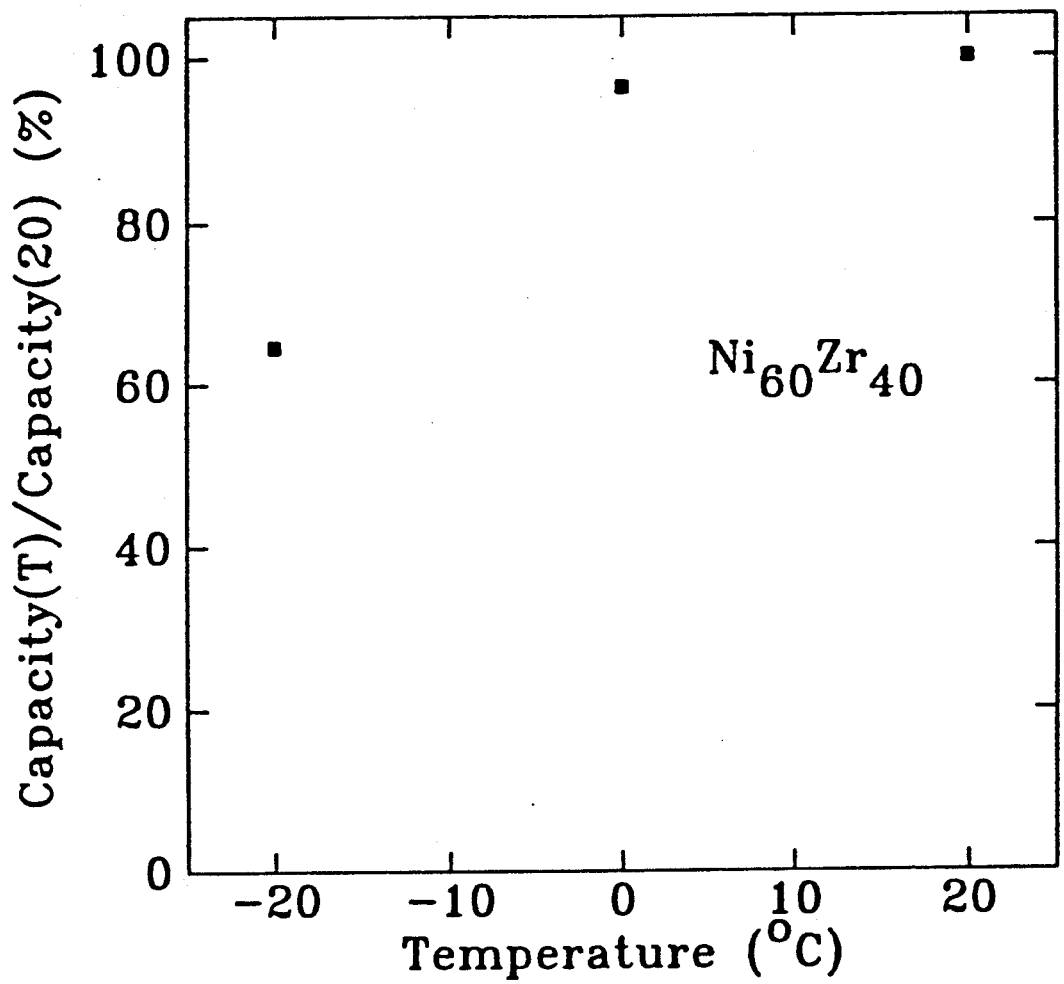
FIG. 4 shows the capacity of a cell of the invention as a function of temperature; satisfactory performance is maintained at −20° C. with only a 35% decrease.
Figure 5A:
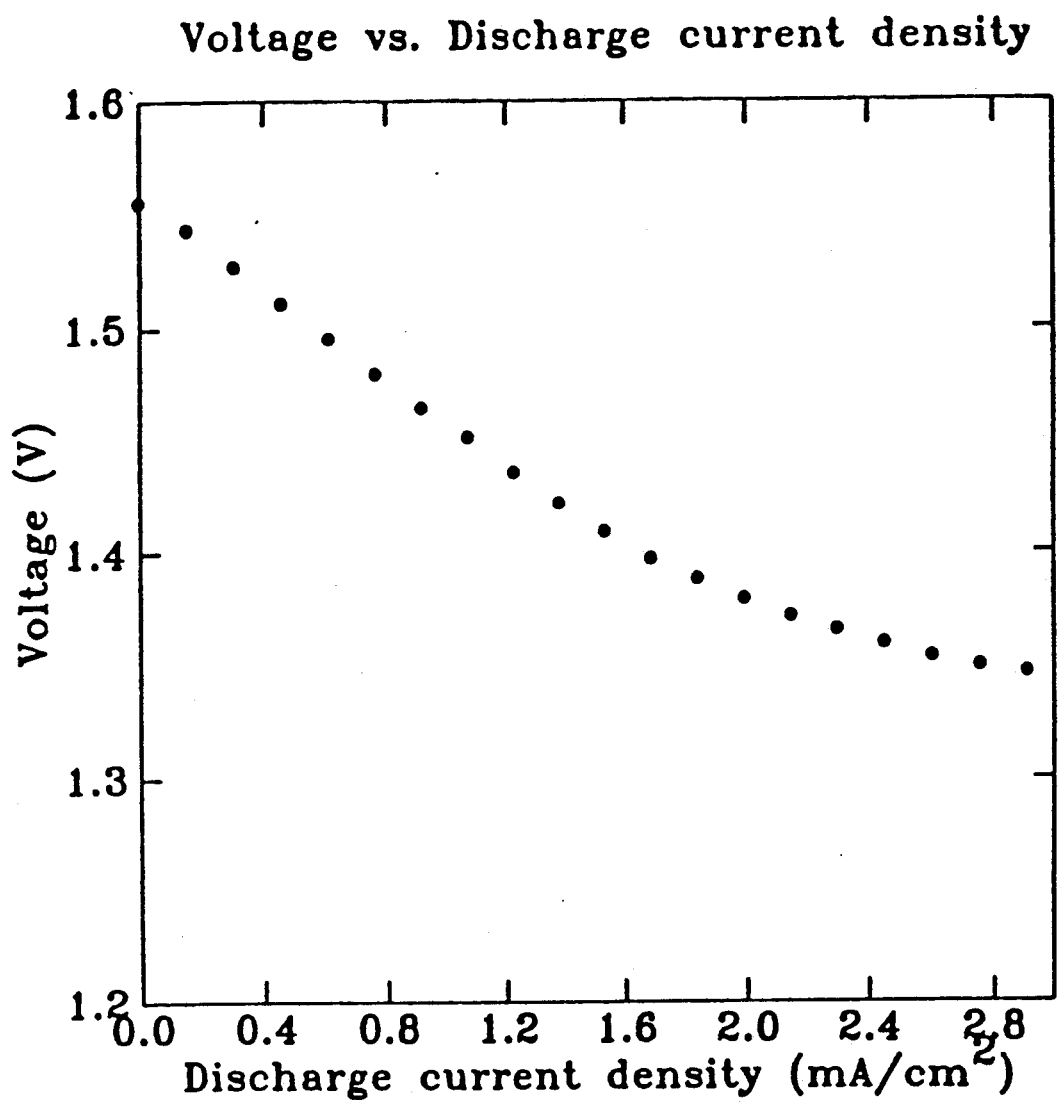
FIG. 5(a) shows the drop in output voltage.
Figure 5B:
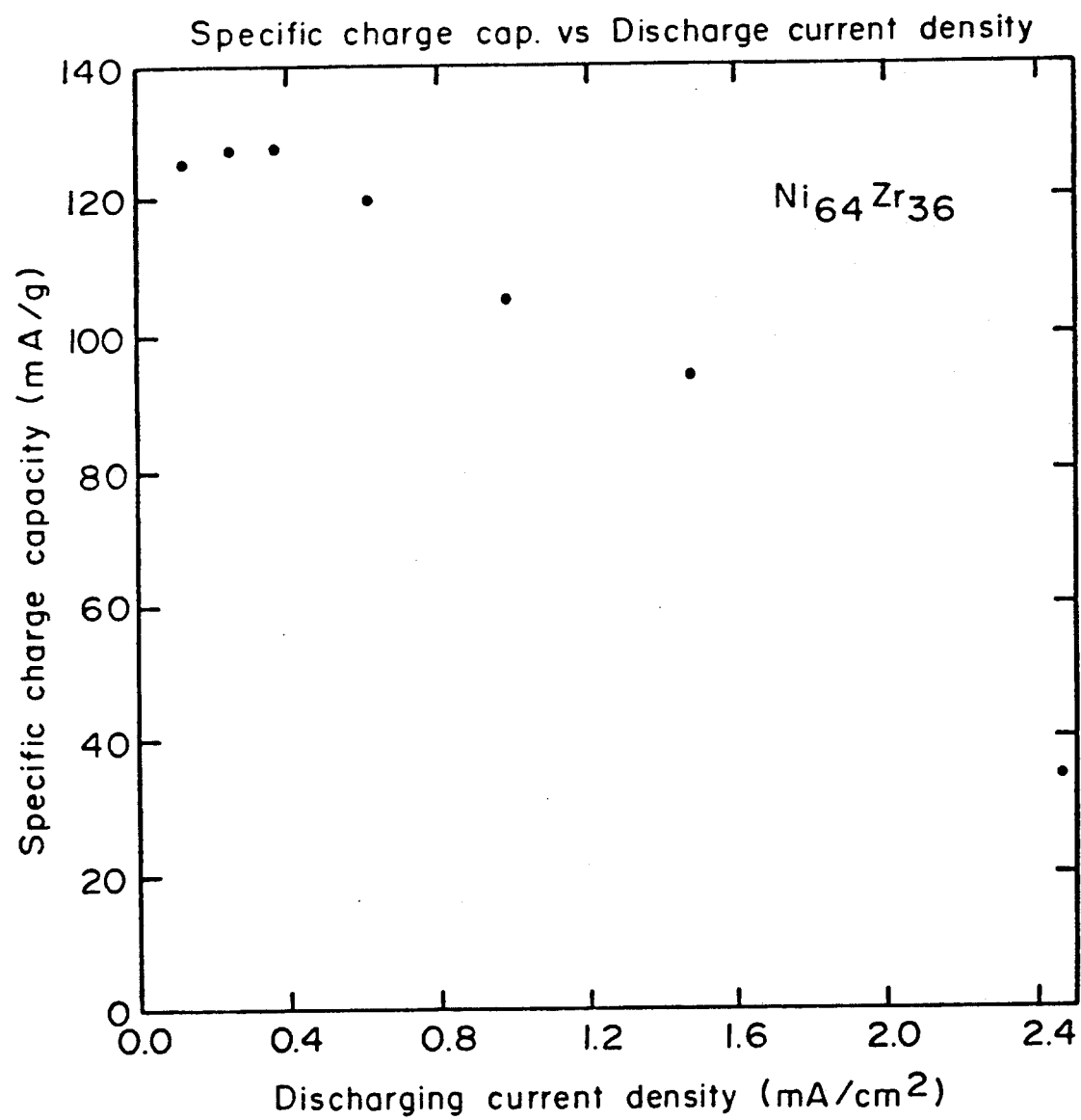
FIG. 5(b) the fall in recovered charge; high discharge rate Ni-Cd cells are available which deliver their charge in b 15 minutes, the cells of the invention achieve 80% efficiency for a 40 minute discharge.
Figure 6:
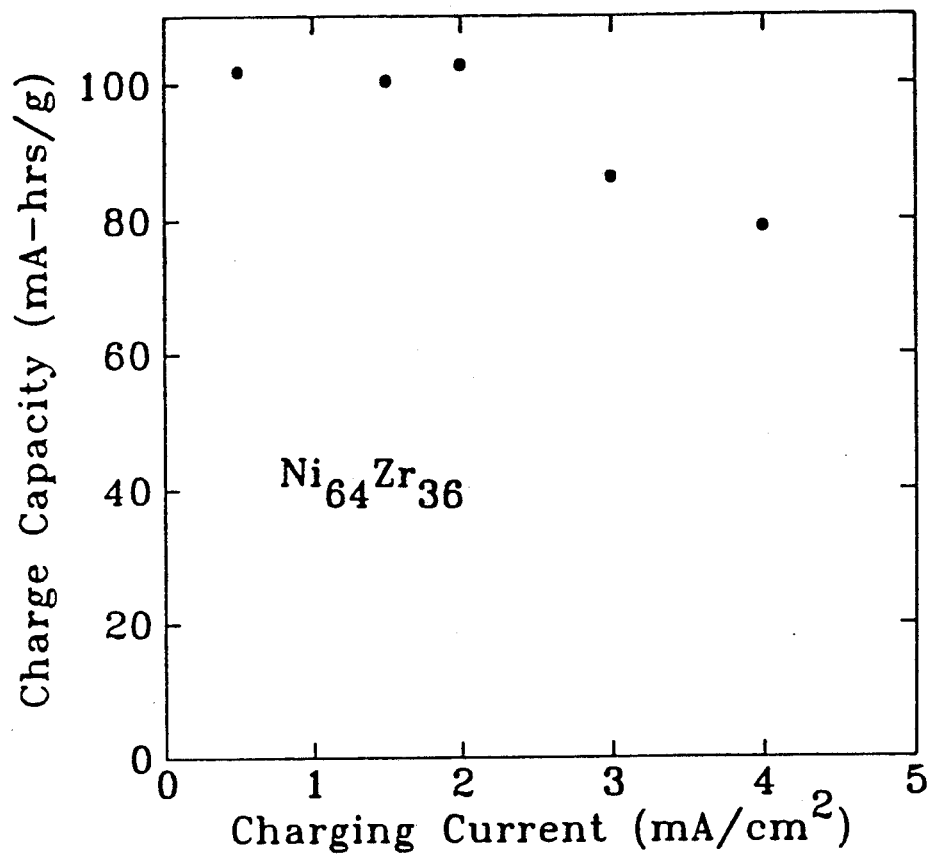
FIG. 6 shows the effect of high charging rates when the total input charge is kept fixed; for comparison, charging times of 2 hours are considered fast for Ni-Cd cells, 10 hours being more usual; the cells of the invention may be charged with 80% efficiency in only 20 minutes.
Figure 7:
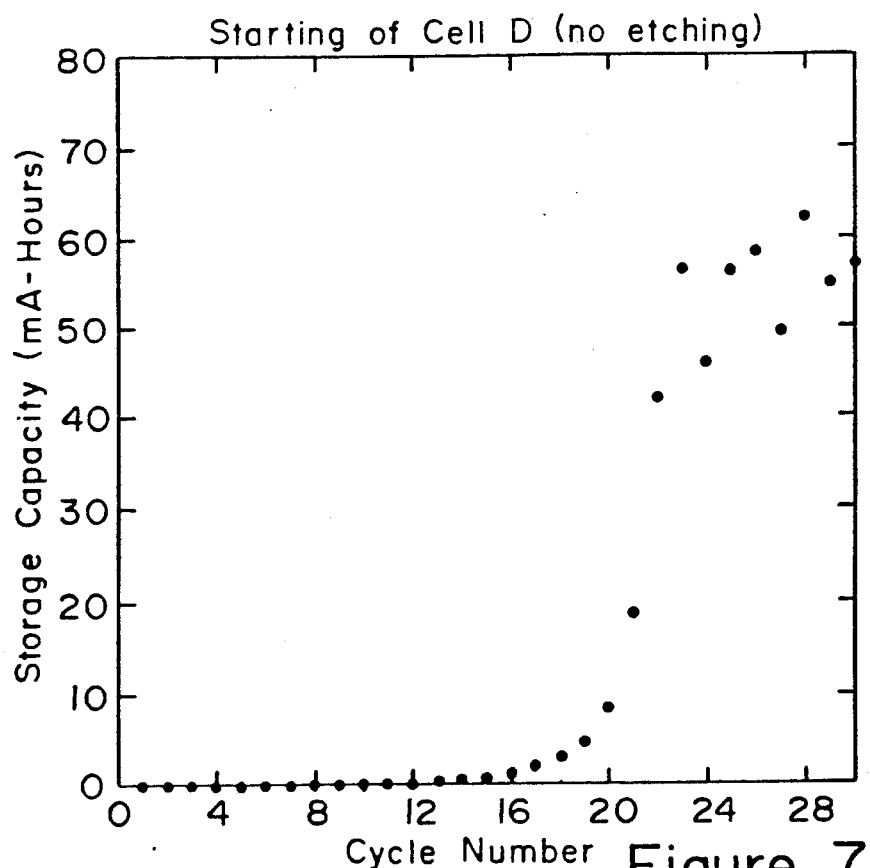
FIG. 7 shows the performance of a cell prior to preliminary etch in dilute hydroflouric acid.
Figure 8:
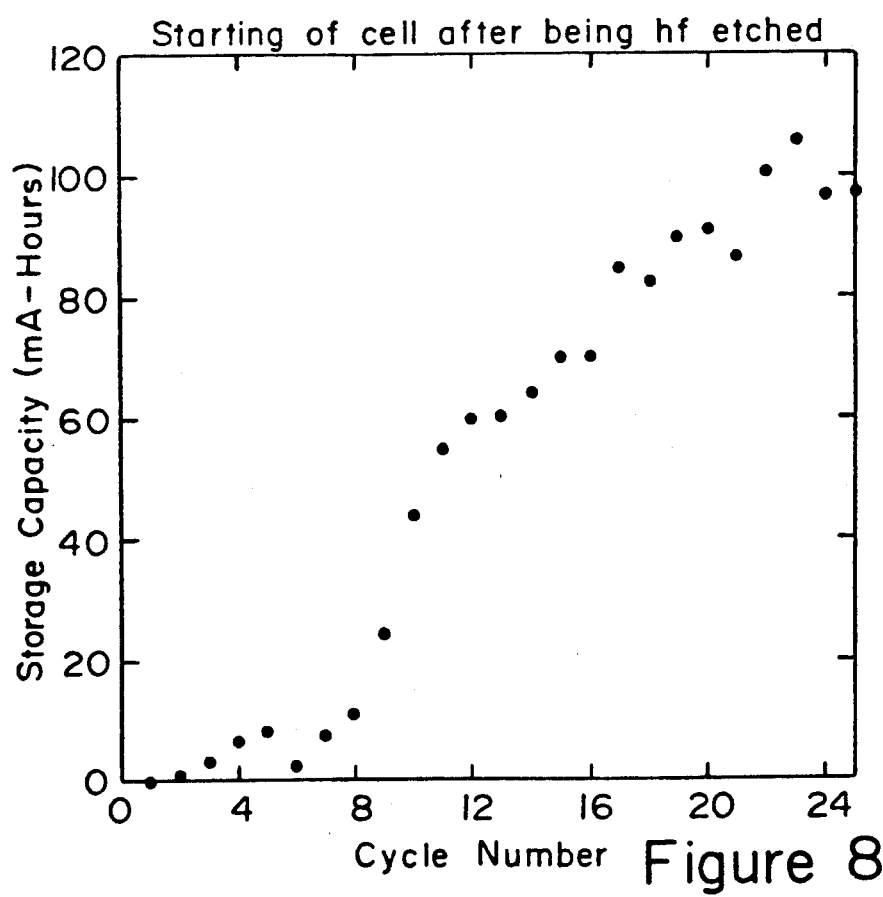
FIG. 8 shows how the initial performance of the cell of FIG. 7 may be enhanced by a preliminary etch in dilute hydrofluoric acid.

We claim:

1. A rechargeable electrolytic cell comprising:
   a first electrode and a second electrode in spaced apart relationship and an electrolyte electrically connecting the first and second electrodes internally of the cell,
   said first electrode having an active component of nickel hydroxide in an electrical connection with said electrolyte,
   said second electrode having an active component of an amorphous alloy in electrical connection with said electrolyte, said amorphous alloy comprising: at least one element selected from the group consisting of Ti, V, Zr, Nb, Hf, Ta and rare earth elements; and at least one metal selected from Fe, Co, Ni, Cu, Ru, Rh, Pd and Ag, said first and second electrodes each having a connecting means for electrically connecting the electrodes with an external electrical circuit.

2. A cell according to claim 1, wherein said rare earth elements are selected from Sc, Y, Ca, Ce, Pr, Nd, Pm, Sm, Eu, Gd, Tb, Dy, Ho, Er, Tm, Yb and Lu.

3. A cell according to claim 2, wherein said amorphous alloy is a binary alloy.

4. A cell according to claim 3, wherein said amorphous alloy comprises a said element selected from Ti, V, Zr, Nb, Hf and Ta and a said metal selected from Fe, Cu, Ni, Ca, Ru, Rh, Pd and Ag.

5. A cell according to claim 3, wherein said amorphous alloy comprises a said rare earth element and a said metal selected from Fe, Co, Ni, Ca, Ru, Rh, Pd and Ag.

6. A cell according to claim 2, wherein said amorphous alloy is an alloy of nickel and zirconium.

7. A cell according to claim 6, wherein said electrolyte comprises aqueous potassium hydroxide solution.

* * * * *